US012596526B2

(12) United States Patent
Suleiman et al.

(10) Patent No.: US 12,596,526 B2
(45) Date of Patent: Apr. 7, 2026

(54) COMPUTER-IMPLEMENTED METHOD AND A DATA PROCESSING HARDWARE FOR PROCESSING SENSOR DATA POINTS

(71) Applicant: Continental Autonomous Mobility Germany GmbH, Ingolstadt (DE)

(72) Inventors: Wassim Suleiman, Kriftel (DE); Nicolai Glatz, Frankfurt am Main (DE); Christopher Brown, Seligenstadt (DE)

(73) Assignee: AUMOVIO Autonomous Mobility Germany GmbH, Frankfurt am Main (DE)

( * ) Notice: Subject to any disclaimer, the term of this patent is extended or adjusted under 35 U.S.C. 154(b) by 66 days.

(21) Appl. No.: 18/574,047

(22) PCT Filed: Jun. 14, 2022

(86) PCT No.: PCT/EP2022/066172
§ 371 (c)(1),
(2) Date: Dec. 25, 2023

(87) PCT Pub. No.: WO2023/274719
PCT Pub. Date: Jan. 5, 2023

(65) Prior Publication Data
US 2024/0289091 A1 Aug. 29, 2024

(30) Foreign Application Priority Data
Jun. 30, 2021 (EP) ..................................... 21182865

(51) Int. Cl.
*G06F 7/08* (2006.01)
(52) U.S. Cl.
CPC ..................................... *G06F 7/08* (2013.01)

(58) Field of Classification Search
CPC ......................................................... G06F 7/08
See application file for complete search history.

(56) References Cited

U.S. PATENT DOCUMENTS 5,770,850 A * 6/1998 Bowen ...................... G01J 1/02
250/203.1

FOREIGN PATENT DOCUMENTS

JP H06103300 A 4/1994
JP 2000122689 A 4/2000
(Continued)

OTHER PUBLICATIONS

Notice of Reasons for Refusal drafted Sep. 27, 2024 for the counterpart Application number: Japanese Patent Application No. 2023-573369 and machine translation of same.
(Continued)

*Primary Examiner* — Van H Oberly

(57) ABSTRACT

This disclosure relates to a computer-implemented method for processing sensor data points by means of a data processing hardware where a distributions buffer for storing an initial plurality of Gaussian distributions is initialized, each Gaussian distribution of the initial plurality of Gaussian distributions including an initial plurality of sensor data points received sequentially from at least one sensor and having an associated predetermined distribution distance threshold, and where the distributions buffer is sequentially updated for a number n of new sensor data points based on a distribution distance condition, generating an updated plurality of Gaussian distributions including either a new Gaussian distribution, or an updated single Gaussian distribution or an updated merged Gaussian distribution.

16 Claims, 4 Drawing Sheets

(56) References Cited

FOREIGN PATENT DOCUMENTS

| | | |
|---|---|---|
| JP | 2012181280 A | 9/2012 |
| JP | 2013200604 A | 10/2013 |
| JP | 2018084627 A | 5/2018 |

OTHER PUBLICATIONS

Notice of Reasons for Refusal mailed on Feb. 12, 2025 for the counterpart Japanese Patent Application No. 2023 573369 and machine translation of same.

European Search Report dated Apr. 1, 2022 for the priority European Patent Application No. 21182865.2.

The International Search Report and the Written Opinion of the International Searching Authority mailed on Oct. 11, 2022 for the PCT Application No. PCT/EP2022/066172 which this application claims priority.

Morales Luis et al., "An Automatic Merge Technique to Improve the Clustering Quality Performed by LAMDA", IEEE Access, IEEE, USA, vol. 8, Sep. 3, 2020 (Sep. 3, 2020), pp. 162917-162944, XP011809111, DOI: 10.1109/ACCESS.2020.3021675.

Christian Gruhl et al., "Detecting Novel Processes with CANDIES—An Holistic Novelty Detection Technique based on Probabilistic Models", arxiv.org, Cornell University Library, 201 Olin Library Cornell University Ithaca, NY 14853, May 18, 2016 (May 18, 2016), XP080701967.

Guoqing Yin et al: "Split-merge algorithm and Gaussian mixture models for AAL", Industrial Electronics (ISIE), 2010 IEEE International Symposium, IEEE, Piscataway, NJ, USA, Jul. 4, 2010 (Jul. 4, 2010), pp. 2314-2318, XP031803370, DOI: 10.1109/ISIE.2010. 5637774, ISBN: 978-1-4244-6390-9.

Decision to Grant a Patent mailed on Jun. 18, 2025 for the counterpart Japanese Patent Application No. 2023 573369 and machine translation of same.

* cited by examiner

COMPUTER-IMPLEMENTED METHOD AND A DATA PROCESSING HARDWARE FOR PROCESSING SENSOR DATA POINTS

CROSS-REFERENCE TO RELATED APPLICATIONS

The present application is a National Stage Application under 35 U.S.C. § 371 of International Patent Application No. PCT/EP2022/066172 filed on Jun. 14, 2022, and claims priority from European Patent Application No. 21182865.2 filed on Jun. 30, 2021, in the European Patent Office, the disclosures of which are herein incorporated by reference in their entireties.

TECHNICAL FIELD

The invention is related to a computer-implemented method and a data processing hardware for processing sensor data points.

BACKGROUND

Raw data points, alternatively called raw sensor data or sensor data points, refer to the data received form sensors.

Lightweight environment maps are maps providing all details of the environment using a small memory footprint (RAM usage) and low Central Processing Unit (CPU) usage, overall a low usage of system resources.

Using sensors for providing various types of data is increasingly used in a wide range of fields of activity and technology. Generally speaking, the sensors provide a large number of raw data points each processing cycle, the raw data points being processed in order to provide relevant information. The processing of the raw data points includes the creation of some sort of data structures according to the needs, the data structures being used to output of the data processing of the sensors data points of each processing cycle.

In some cases, the output the data processing of the raw data points is used to build environment mapping. One example is to describe static objects in the environment, where the sensor(s) generate "dense" raw data points from the objects in the scene, such as in the case of automotive industry or in the case of management of warehouses or other spaces where a large number of objects are stored.

In other cases, the output the data processing of the raw data points is used as such to be transmitted to a decision maker without generating an environment map. One example is medical field where the sensors collect data from the patient and send them to a medical device to be further analyzed by a medical specialist.

The first disadvantage is that the distribution of the data received from the sensors is not preserved during the processing of the large number of raw points. The second disadvantage stems from the first. In the absence of preserving the distribution of the data received from the sensors, saving a large number of raw points leads to large volumes of data for the processing of which increasingly large memory and processing power of the hardware unit or units are required.

In the particular case of the automotive industry, sensors data comes from modern sensors such as LiDAR, Radar, and ultrasound used for environment mapping of static objects from the scene, where they provide a large number of points each processing cycle.

A map of the environment is usually constructed using these sensors data points, e.g., grid maps or point cloud. The creation and update of the map require large memory and computation, which limits the possibilities of building the architecture of the electronic control units of the vehicle.

The problem to be solved by the present disclosure is to provide a more efficient method for processing sensor data points received from the sensors collecting data, in particular from static objects in the environment, preserving the distribution of the sensor data in a predetermined data structure, by using less memory and less computing resources compared to the existing solutions.

SUMMARY

In order to solve the problem, the inventors conceived in a first aspect a computer-implemented method for processing sensor data points including four steps carried out by means of a data processing hardware:

1.1. Initializing a distributions buffer G for storing an initial plurality of Gaussian distributions $g_n$, each Gaussian distribution g comprising an initial plurality of sensor data points Pr received sequentially from at least one sensor, each Gaussian distribution g having an associated predetermined distribution distance threshold $Dd_{min}$;

1.2. Sequentially acquiring a new sensor data point $Pr_{new}$ from the at least one sensor and computing a distribution distance Dd between the new sensor data point $Pr_{new}$ and each Gaussian distribution g;

1.3. Verifying for each Gaussian distribution g if the distribution distance Dd fulfills a distribution distance condition Dd $Dd_{min}$, respectively the distribution distance Dd<the associated predetermined distribution distance threshold $Dd_{min}$;

1.3.1. If no Gaussian distribution g fulfills the distribution distance condition Dd<$Dd_{min}$, generating a new Gaussian distribution $g_{new}$, including the new sensor data point $Pr_{new}$;

1.3.2. If the distribution distance condition Dd<$Dd_{min}$ is fulfilled by a single Gaussian distribution $g_1$, updating said single Gaussian distribution $g_1$ by adding the new sensor data point $Pr_{new}$, generating an updated Gaussian distribution $g_{1-updated}$;

1.3.3. If the distribution distance condition Dd<$Dd_{min}$ is fulfilled by at least two Gaussian distributions $g_1$, $g_2$, . . . $g_m$, merging the at least two Gaussian distributions $g_1$, $g_2$ . . . $g_m$, generating a merged Gaussian distribution $g_m$-merged, and updating said merged Gaussian distribution $g_{m-merged}$ by adding the new sensor data point $Pr_{new}$, generating an updated merged Gaussian distribution $g_{m-merged-updated}$;

1.4. Updating the initial plurality of Gaussian distributions $g_n$ by including:

either the new Gaussian distribution $g_{new}$, or the updated single Gaussian distribution $g_{1-updated}$, or the updated merged Gaussian distribution $g_{m-merged-updated}$;

and generating an updated plurality of Gaussian distributions $g_{n-updated}$ in the distributions buffer G, the steps 1.2., 1.3., and 1.4. are repeated for a number n of new sensor data points $Pr_{n-new}$.

In a second aspect of the present disclosure it is provided a data processing hardware being configured to carry out the steps of the computer-implemented method for processing sensor data points.

The present disclosure extends to any novel aspects or features described and/or illustrated herein. Any feature in one aspect of the present disclosure may be applied to other aspects of the present disclosure, in any appropriate combination. Particular combinations of the various features of the present disclosure can be implemented and/or supplied and/or used independently.

The main advantages of this present disclosure are the following:

generating a predetermined data structure for the sensor data points received from one or multiple sensors (e.g., ultrasound, radar, etc.) as input and preserving the predetermined data structure during the processing of the sensor data points for successive processing cycles.

saving memory and computing power resources of the data processing hardware by using the predetermined data structure during the processing of the raw point cloud for successive processing cycles.

due to savings of memory and computing power resources, enabling use of the present disclosure to process raw sensors data by a wider range of data processing hardware, in particular the small-sized data processing hardware, which in its turn enables the use of the present disclosure in a wider range of situations, for example by providing some sensors with the data processing hardware instead of sending the raw sensor data to be processed elsewhere.

BRIEF DESCRIPTION OF THE DRAWINGS

The present disclosure is explained in more detail below with reference to the figures of exemplary embodiments, wherein.

DETAILED DESCRIPTION

Raw sensor data usually embeds large scale unclean and useless data. The large quantity of unwanted and useless data leads to unnecessary increase of memory and computing power which is not desired in a constrained sensor network.

Thus, the raw sensor data need to undergo first data cleaning processing, outputting cleaned sensor data which is processed to obtain relevant information. Further, the proposed approach uses Gaussian distributions to process raw sensor data. Since the Gaussian distributions are built sequentially, there is no need to save the raw points.

Figure 1:
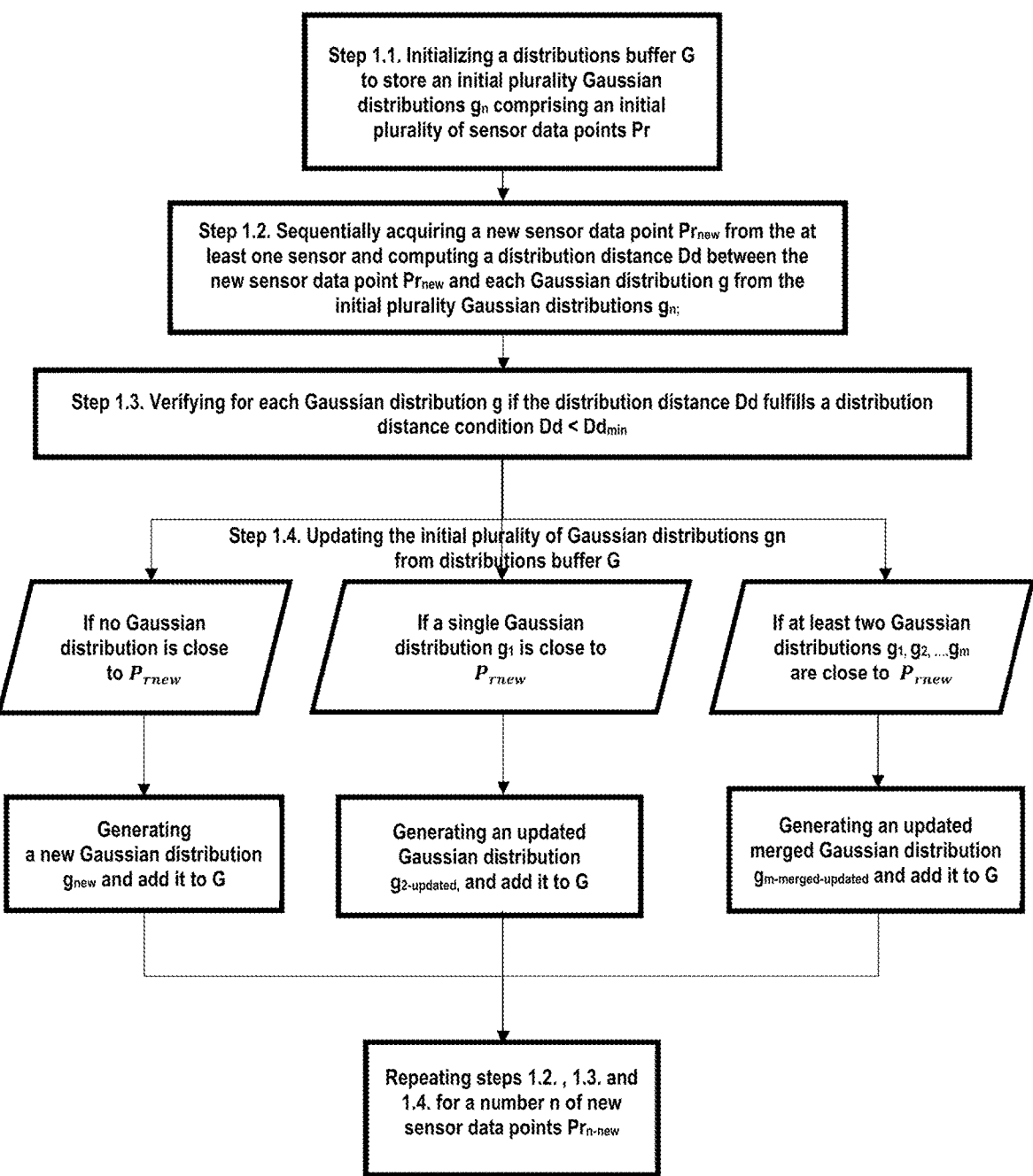
FIG. 1 represents schematically the method for processing sensor data points according to the present disclosure.

With reference to FIG. 1, the computer-implemented method for processing sensor data points, according to the present disclosure includes four steps carried out by means of a data processing hardware.

In step 1.1. a distributions buffer G is initialized to store an initial plurality of Gaussian distributions $g_n$, each Gaussian distribution g including an initial plurality of sensor data points Pr received sequentially from at least one sensor.

The sensor data points Pr used in the method are received, for example, from one or multiple sensors, or from a processing unit as a result of the fusion or other type of processing of the sensor data points Pr received form the sensors, or from any other source providing sensor data points. Non-limiting examples of sensors include: ultrasound sensors, radar sensors, location sensors, such as GPS, movement sensors, such as accelerometer, gyroscope, camera sensors, light sensors, microphones, proximity sensors, magnetometers, sensors for measuring temperature, pressure, humidity, medical parameters of the body, chemical and biochemical substances, and neural signals, also infrared sensors, IR cameras, motion detectors, measuring the distance to nearby objects, presence of smoke and gases, moisture sensors.

The sensor data points Pr include any of the following type: sensor data points Pr having two coordinates x, y, sensor data points, Pr having three coordinates x, y, z, or sensor data points Pr having two or three coordinates and having additional features, such as reflection amplitude, direction, radial velocity, acceleration. The sensor data points Pr also include errors, the errors having the same number of coordinates as the sensor data points Pr, i.e., two coordinates x, y, or three coordinates x, y, z.

Gaussian distributions $g_n$ are defined by mean and covariance, for example for 2D sensor data points, with x and y coordinates, the mean is a vector of two coordinates and the covariance matrix is a symmetric 2×2 matrix, i.e., in such case 5 floating numbers are required to represent the distribution. Each Gaussian distribution g has an associated predetermined distribution distance threshold $D_{dmin}$.

In step 1.2. a new sensor data point $Pr_{new}$ is sequentially acquired from the at least one sensor. The data processing hardware computes a distribution distance Dd between the new sensor data point $Pr_{new}$ and each Gaussian distribution g from the initial plurality of Gaussian distributions $g_n$.

Further on, in step 1.3. the data processing hardware verifies for each Gaussian distribution g if the distribution distance Dd fulfills a distribution distance condition $Dd < Dd_{min}$, respectively if the distribution distance Dd<the associated predetermined distribution distance threshold $Dd_{min}$.

There are three mutual excluding possibilities:

1.3.1 If no Gaussian distribution g fulfills the distribution distance condition $Dd < Dd_{min}$, a new Gaussian distribution $g_{new}$ is generated, including the new sensor data point $Pr_{new}$, 1.3.2 If the distribution distance condition Dd<Ddmin is fulfilled by a single Gaussian distribution g1, the single Gaussian distribution g1 is updated by adding the new sensor data point Prnew, generating an updated single Gaussian distribution g1-updated, 1.3.3. If the distribution distance condition Dd<Ddmin is fulfilled by at least two Gaussian distributions g1, g2, . . . gm, the at least two Gaussian distributions g1, g2 . . . gm are merged, generating a merged Gaussian distribution gm-merged, and the merged Gaussian distribution gm-merged is updated by adding the new sensor data point $Pr_{new}$, generating an updated merged Gaussian distribution $g_{m\text{-}merged\text{-}updated}$.

In the final step 1.4., the initial plurality of Gaussian distributions $g_n$ from the distributions buffer G is updated by including:

either the new Gaussian distribution gnew or the updated single Gaussian distribution g1-updated or the updated merged Gaussian distribution gm-merged-updated.

The steps 1.2., 1.3., and 1.4. are repeated for a number n of new sensor data points $Pr_{n-new}$.

At the end of the method, an updated plurality of Gaussian distributions $g_{n-updated}$ is generated in the distributions buffer G.

The main advantage of the updated plurality of Gaussian distributions $g_{n-updated}$ is that it defines a predetermined data structure for the plurality of sensor data points which are received from the sensors based on Gaussian distributions and predetermined distribution distance thresholds $D_{dmin}$, and preserves the respective predetermined data structure during the processing of the sensor data points for successive processing cycles. The main advantage stems from using the features of the Gaussian distributions that filter plurality of sensor data points and remove outliers, eliminating the need to save the plurality of sensor data points, as depicted in the embodiment represented in FIG. 2.

The applying the method of the present disclosure has the advantage of saving memory and computing power resources of the data processing hardware by using the predetermined data structure during the processing of the raw point cloud for successive processing cycles.

Further on, due to savings of memory and computing power resources, the present disclosure has the advantage of enabling the processing of raw sensors data by a wider range of data processing hardware, in particular the small-sized data processing hardware, which in its turn enables the use of the present disclosure in a wider range of situations.

Before detailing some examples of use of the present disclosure in various fields of technology it is convenient to present some embodiments of the method of the present disclosure, because the large variety of the embodiments is the one that enables use of the invention in a wide range of fields.

In an embodiment, the distribution distance Dd is a Euclidian distance between the new sensor data point $Pr_{new}$ and the mean $\mu_g$ of each Gaussian distribution g.

A particular advantage of using the Euclidian distance is saving the computing power resources, enabling use of the present disclosure to process raw sensors data by a wider range of data processing hardware. Saving computer power resources has the further advantage that it reduces the costs of the computation.

In another embodiment, in order to further save computing resources, the distribution distance is a norm one distance, i.e., using 1 norm defining, for example in two dimensions as distribution distance Dd=|x1−x2|+|y1−y2|.

In another embodiment, the distribution distance Dd is the probability of the new sensor data point $Pr_{new}$ in respect to each Gaussian distribution g of the initial plurality Gaussian distributions $g_n$ as follows:

$$D_d = prob(Pr_{new}, g_n) = \mathcal{N}\left(Pr_{new}; \mu_n, \sum_n\right) =$$

$$(2\pi)^{-\frac{k}{2}} \det\left(\sum_n\right)^{-\frac{1}{2}} \exp\left(-\frac{1}{2}(Pr_{new} - \mu_n)^T \sum_n^{-1} (Pr_{new} - \mu_n)\right)$$

where:

$\mathcal{N}(Pr_{new}; \mu_n, \Sigma_n)$ is the probability that the new point $Pr_{new}$ is generated from each Gaussian distribution g;

$Pr_{new}$ is a new sensor data point, being a vector of k entries;

$\mu_n$ is the mean of each Gaussian distribution g, being a vector of k entries;

$\Sigma_n$ is the covariance of each Gaussian distribution g, being a (k×k) matrix;

T is the transpose.

In this embodiment, the new points $Pr_{new}$ are more likely to belong to each Gaussian distribution g which yields the higher probability in respect to previous embodiment.

In another embodiment, the computing of the distribution distance Dd is carried out by calculating the normalized probability of the point $Pr_{new}$ with respect to each Gaussian distribution g of the initial plurality Gaussian distributions $g_n$, as follows $$D_d = \frac{Prob(Pr_{new}, g_n)}{c}$$

where c is a normalization factor.

In this embodiment, the new points $Pr_{new}$ are also more likely to belong to the distribution which yields the higher probability in respect to previous embodiment, the distribution distance Dd being invers proportionally with the probability.

The particular advantage of this embodiment over the previous one is that the normalization factor c can be chosen so that for the new points $Pr_{new}$ placed inside an equi-probability ellipse, namely the ellipse for which prob($Pr_{new}$, $g_n$)=C, the normalization factor c>1, whereas for the new points $Pr_{new}$ placed outside the equi-probability ellipse the normalization factor c<1.

In another embodiment, the distribution distance Dd is computed using the Mahalanobis distance formula. The use of the Mahalanobis distance formula applies irrespective of defining or not the distribution distance Dd as the probability of the new sensor data point $Pr_{new}$ as well as irrespective of computing or not the distribution distance Dd as Euclidian distance between the new sensor data point $Pr_{new}$ and the mean $\mu_g$ of each Gaussian distribution g.

Using the Mahalanobis distance formula is in particular advantageous since is less computationally expensive as the other distances excepting Euclidian distance.

In another embodiment, the sequential update of the updated single Gaussian distribution $g_{1-updated}$, and the updated merged Gaussian distribution $g_{m-merged-updated}$ by sequentially adding a number n of new sensor data points $Pr_{n-new}$ are carried out by the formulas:

$$\mu_{g_{n-updated}} = \frac{n-1}{n}\mu_{g_n} + \frac{1}{n}Pr_{n-new}$$

and $$\sum_{g_{n-updated}} = \frac{n-2}{n-1}\sum_{g_n} + \frac{1}{n}\Delta\Delta^T$$

and $$\Delta = Pr_{n-new} - \mu_{g_n}$$

where:

$\mu_{gn}$ is the mean of any of the single Gaussian distribution $g_1$, and the merged Gaussian distribution $g_{m-merged}$;

$\Sigma_{gn}$ is the covariance of any of the single Gaussian distribution $g_1$, and a merged Gaussian distribution $g_{m-merged}$;

$\mu_{gn\text{-}updated}$ is the mean of any of the updated single Gaussian distribution $g_{1\text{-}updated}$, and the updated merged Gaussian distribution $g_{m\text{-}merged\text{-}updated}$, $\Sigma_{gn\text{-}updated}$ is the covariance of any of the updated single Gaussian distribution $g_{1\text{-}updated}$, and the updated merged Gaussian distribution $g_{m\text{-}merged\text{-}updated}$, T is the transpose.

The sequential updating embodiment is described only for the purposes of illustrating the principles of the present disclosure, however any sequential updating leading to the same outcome may be applied without departing from such principles.

In another embodiment of the sequential update of the updated single Gaussian distribution $g_{1\text{-}updated}$, and the updated merged Gaussian distribution $g_{m\text{-}merged\text{-}updated}$ by sequentially adding a number n of new sensor data points $Pr_{n\text{-}new}$, which is even more numerically stable, is carried out by formula:

$$\mu_{gn\text{-}updated} = \mu_{gn} + \frac{1}{n}\left(Pr_{n\text{-}new} - \mu_{gn}\right)$$

For the mean and for the variance one updates a variable S is used as follows:

$$S_{gn\text{-}updated} = S_{gn} + \Delta\Delta_{updated}^T$$

where $\Delta = Pr_{n\text{-}new} - \mu_{gn}$ $\Delta_{updated} = Pr_{n\text{-}new} - \mu_{gn\text{-}updated}$ and S is related to $\Sigma$ through $$\sum = \frac{1}{n}S$$

The sequentially adding a number n of new sensor data points $Pr_{n\text{-}new}$ applies irrespective of defining or not the distribution distance Dd as the probability of the new sensor data point $Pr_{new}$, as well as irrespective of computing or not the distribution distance Dd as Euclidian distance between the new sensor data point $Pr_{new}$ and the mean $\mu_g$ of each Gaussian distribution g, as well as irrespective of computing or not the distribution distance Dd using the Mahalanobis distance formula.

In another embodiment, the new sensor data point $Pr_{new}$ is provided with a covariance matrix $\Sigma_{Pr_{new}}$, forming a sensor data points Gaussian distribution $N_{Pr_{new}}$ $(\mu_{Pr_{new}}, \Sigma Pr_{new})$ and the distribution distance Dd is computed between each Gaussian distribution g and said sensor data points Gaussian distribution $N_{Pr_{new}}$ using the Kullback-Leibler divergence or the Bhattacharyya distance.

In another embodiment, the merging of the at least two Gaussian distributions $g_1, g_2 \ldots g_m$ is carried out by successive merging pairs of two distributions from at least two Gaussian distributions $g_1, g_2 \ldots g_m$ generating a merged Gaussian distribution $g_{m\text{-}merged}$ and by weighting the mean and variance of the two distributions from the respective pairs of two distributions. The successive merging is carried out as follows:

selecting a pair of distributions from at least two Gaussian distributions $g_1, g_2 \ldots g_m$, generating a first intermediary merged Gaussian distribution $g_{m\text{-}merged\text{-}intermediary}$ by weighting the mean and variance of the two distributions from the pair, selecting another distribution from at least two Gaussian distributions $g_1, g_2 \ldots g_m$ and merging it with the intermediary merged Gaussian distribution $g_{m\text{-}merged\text{-}intermediary}$ generating a second intermediary merged Gaussian distribution $g_{m\text{-}merged\text{-}intermediary}$, continuing the generation of further intermediary merged Gaussian distribution $g_{m\text{-}merged\text{-}intermediary}$ until all the distributions from at least two Gaussian distributions $g_1, g_2 \ldots g_m$ are included in the merge.

The successive merging is carried out according to the formula:

$$\mu_{g_{m\text{-}merged}} = \frac{n1}{n1+n2}\mu_{g1} + \frac{n2}{n1+n2}\mu_{g2}$$

$$\sum\nolimits_{g_{m\text{-}merged}} = \frac{n1}{n1+n2}\left(\sum\nolimits_{g1} + \tilde{\Delta}_1\tilde{\Delta}_1^T\right) + \frac{n2}{n1+n2}\left(\sum\nolimits_{g2} + \tilde{\Delta}_2\tilde{\Delta}_2^T\right)$$

where:

$\tilde{\Delta}_1 = \mu_{g1} - \mu_{g_{m\text{-}merged}}$ and $\tilde{\Delta}_2 = \mu_{g2} - \mu_{g_{m\text{-}merged}}$ $\mu_{g1}, \mu_{g2}$ are the means of the two distributions from the pair;

$\Sigma_{g1}, \Sigma_{g2}$ are the variance of the two distributions from the pair;

$\mu_{gm\text{-}merged}$ is the mean of merged Gaussian distribution $g_{m\text{-}merged}$;

$\Sigma_{gm\text{-}merged}$ is the variance of merged Gaussian distribution $g_{m\text{-}merged}$.

The method of the present disclosure in any of the embodiments described above is applied in different field of technology. Depending on the purpose of using the method, different type and number of the sensors are used and particular embodiments from the above can lead to better results. For all possible uses of the method, the advantage of saving memory and computing power enables for example by providing some sensors with the data processing hardware instead of sending the raw sensor data to be processed elsewhere as well as enables the use of small sized hardware processing units.

Figure 2:
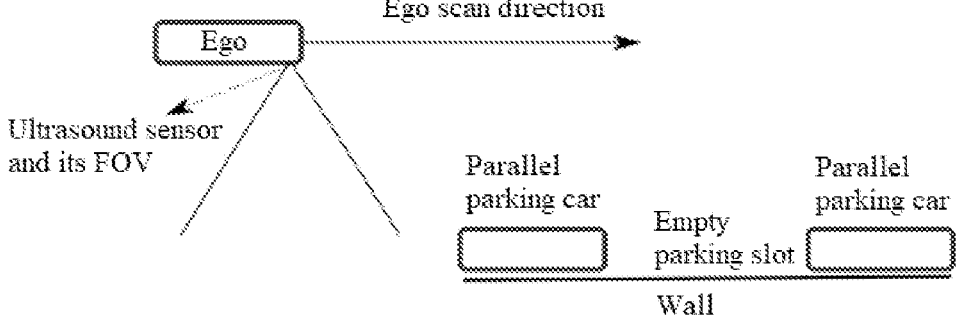
FIG. 2 represents an example of scenery in one of the embodiments using the method of the present disclosure.
Figure 4:
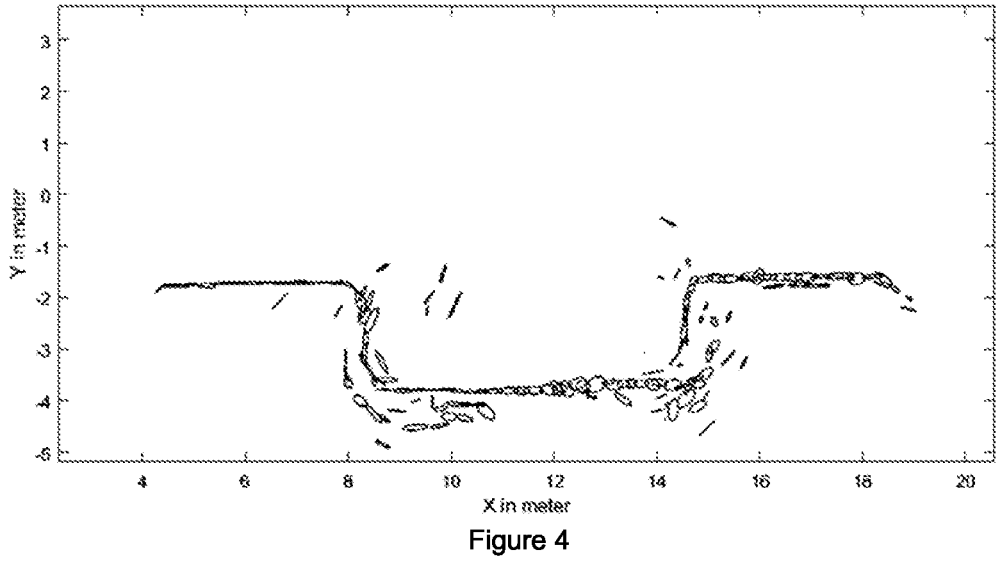
FIG. 4 represents a schematic illustration of applying the method in the same embodiment using the example of scenery of FIG. 2, for constructing ellipses from the points shown in FIG. 2.
Figure 5:
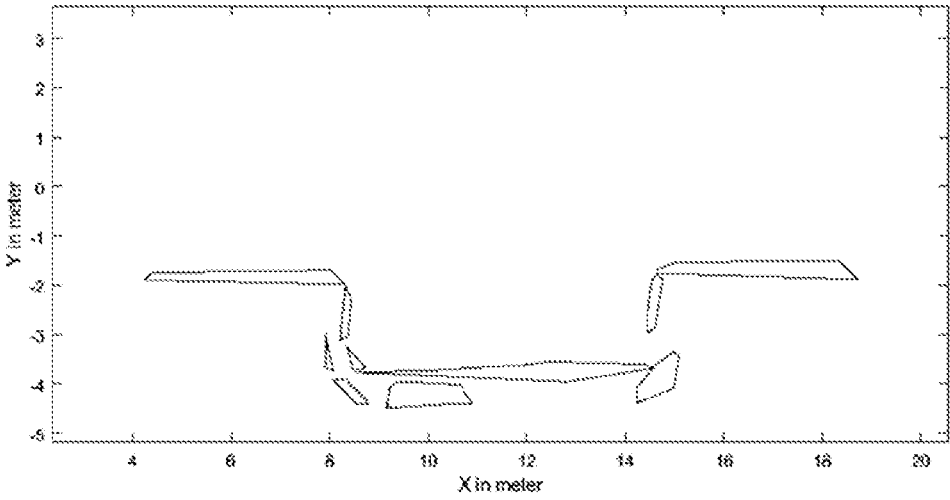
FIG. 5 represents a schematic illustration of the method according to the same embodiment for the scenery of FIG. 2, namely the construction of objects (here, convex hulls) from the ellipses.

As seen in FIG. 2, FIG. 4, FIG. 5, the updated plurality of Gaussian distributions $g_{n\text{-}updated}$ generated by the method can be used in intelligent parking management, in smart transportation system, where the drivers can easily check to find out which parking has free spaces, or in intelligent warehouse management where one can be seen where free spaces are available. The new sensor data points Prn new is sequentially acquired from the sensors governing these types of applications such as: GPS sensors for location, accelerometers for speed, gyroscopes for direction, RFIDs for vehicle identification, infrared sensors for detecting passengers and vehicles, and cameras for recording vehicle movement.

The updated plurality of Gaussian distributions $g_{n\text{-}updated}$ generated by the method can be used in smart transport applications and in traffic surveillance and management applications which manage daily traffic in cities using sensors and intelligent information processing systems, to minimize traffic congestion, ensure easy and hassle-free parking, and avoid accidents by properly routing traffic and spotting drunk drivers, and estimating the traffic conditions, traffic patterns so that future traffic conditions can be estimated, and vehicle tracking system for traffic surveillance may be implemented. Also, the updated plurality of Gaussian distributions $g_{n\text{-}updated}$ generated by the method can be used in applications that ensure safety of people travelling in their vehicles, and accident detection applications using the corresponding sensors.

In case the new sensor data points $Pr_{new}$ are sequentially acquired from the sensors collecting data from patients, the updated plurality of Gaussian distributions $g_{n\text{-}updated}$ generated by the steps of the method can be used in applications dedicated to continuously monitor and record their health conditions and transmit warnings in case any abnormal indicators are found.

With reference to FIG. 2, FIG. 3, FIG. 4, FIG. 5, it is shown a typical example of using the method of the present disclosure in any of the previous embodiments in intelligent parking management or intelligent warehouse management is to build, where a lightweight representation of a static environment comprising a plurality of objects $o_n$ from a buffer O is created by using the initial plurality Gaussian distributions $g_n$, and the updated plurality of Gaussian distributions $g_{n\text{-}updated}$ from the distributions buffer G. The plurality of objects $o_n$ from the buffer O could be any mathematical type example polygons, convex-hulls etc. This mathematical representation corresponds to one or part of a real object. For example a parking car can be represented by one or more polygons. Each object is built from distributions which are similar based on the distance measure.

Such lightweight representation of the static environment is used when it is needed to spot a free space between objects, such as in the case of automotive industry or in the case of management of warehouses or other spaces where a large number of objects are stored.

FIG. 2 depicts the scenery of particular example of this embodiment in which the ego vehicle scans two parallel vehicles parked parallelly to a wall, having an empty parking slot between them.

Figure 3:
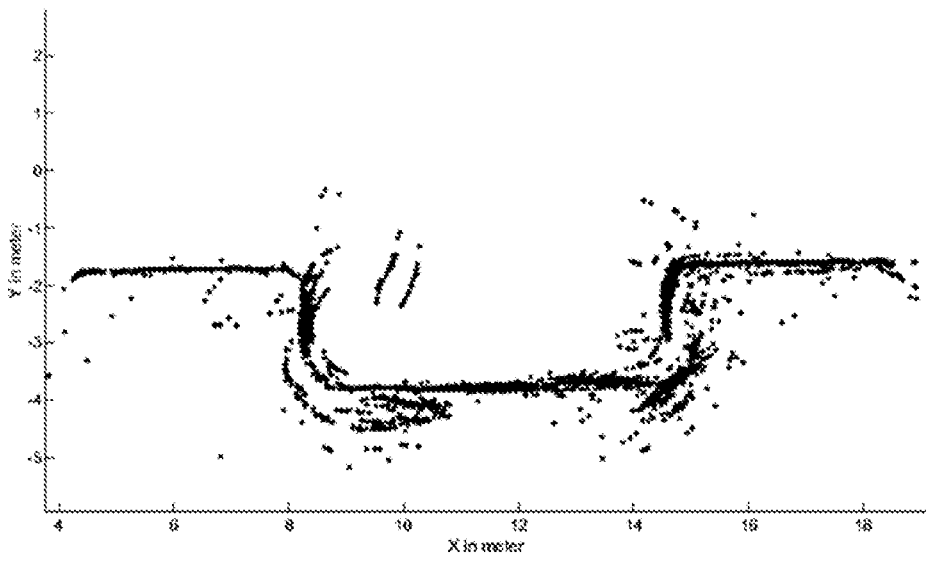
FIG. 3 represents the results of applying prior art methods for the scenery of FIG. 2.

FIG. 3 depicts the "dense" data points from the objects in the scenery according to prior art, namely 2D data points acquired from 12 ultrasound sensors of the ego vehicle.

In step 8.1. it is defined an initial plurality of objects $o_{n\text{-}initial}$ as a list of distribution from the initial plurality Gaussian distributions $g_n$, e.g., an object o comprises the distributions g1, g2, g5, specifically o={g1, g2, g5}.

In step 8.2. it is received from the updated plurality of Gaussian distributions $g_{n\text{-}updated}$:

either the new Gaussian distribution $g_{new}$, or the updated single Gaussian distribution $g_{1\text{-}updated}$, or the updated merged Gaussian distribution $g_{m\text{-}merged\text{-}updated}$, referred to for the ease of understanding as an updated distribution.

Then, it is computed an object distance Do from the updated distribution to each object o of the initial plurality of objects $o_{n\text{-}initial}$. Thus, for the above example the object distance Do is defined as the smallest distance between updated distribution g and all distributions belonging to object o, i.e., distance (o, g)=min {distance(g1, g), distance (g2, g), distance(g5, g)}, where o={g1, g2, g5}, the distance between distributions being calculated as defined above using the Kullback-Leibler divergence or the Bhattacharyya distance.

In step 8.3. it is verified if the updated distribution satisfies an object distance condition, namely if the object distance Do<a predetermined object distance threshold $Do_{min}$ ($Do<Do_{min}$) and then it is updated the initial plurality of objects $o_{n\text{-}initial}$, generating an updated plurality of objects $o_{n\text{-}updated}$ depending on the type of updated distribution, as follows:

When the updated distribution is the new Gaussian distribution $g_{new}$, the updating of the initial plurality of objects $o_{n\text{-}initial}$ is carried out as follows:

if the updated distribution does not satisfy the object distance condition ($Do<Do_{min}$) in respect to any object from the initial plurality of objects $o_{n\text{-}initial}$, a new object $o_{new}$ is generated by assigning the new Gaussian distribution $g_{new}$ and the new object $o_{new}$ is saved in the objects buffer O;

if the updated distribution satisfies the object distance condition ($Do<Do_{min}$) in respect to the single object $o_1$, the single object $o_1$ is updated by assigning the new Gaussian distribution $g_{new}$, generating an updated single object $o_{1\text{-}updated}$, and the updated single object $o_{1\text{-}updated}$ is saved in the objects buffer O. For the above example, where the object is defined as a list of Gaussian distribution o={g1, g2, g5}, after assigning the Gaussian distribution, the object becomes o={g1, g2, g5, g}. The updating the convex-hull representation may be carried out by any convex hull creation algorithm by selecting the specific points to represent each respective distribution from the corresponding object o as it is described below in the embodiments.

if the updated distribution satisfies the object distance condition ($Do<Do_{min}$) in respect to multiple objects $o_m$ of the initial plurality of objects $o_{n\text{-}initial}$, the multiple objects $o_m$ are merged, generating a merged object $o_{m\text{-}merged}$, the new Gaussian distribution $g_{new}$ are assigned to the merged object $o_{m\text{-}merged}$ generating an updated merged object $o_{m\text{-}merged\text{-}updated}$ which is saved in the objects buffer O.

For the above example, where there is a first object defined as a list of Gaussian distributions o={g1, g2, g5}, and a second object o'={g3, g10}, after merging the first object o with the second object o' it is obtained a merged object defined as o"={g1, g2, g5, g3, g10}.

When the updated distribution is the updated single Gaussian distribution $g_{1\text{-}updated}$, the updating of the initial plurality of objects $o_{n\text{-}initial}$ is carried out by updating the representation of corresponding the object o comprising the single Gaussian distribution $g_1$, generating an updated object $o_{updated}$, and saving the updated object $o_{updated}$ in the objects buffer O;

When the updated distribution is the updated merged Gaussian distribution $g_{m\text{-}merged\text{-}updated}$, the updating of the initial plurality of objects $o_{n\text{-}initial}$ is carried out as follows:

if the updated distribution satisfies the object distance condition ($Do<Do_{min}$) in respect to the single object $o_1$, the representation of the single object $o_1$ is updated by including the updated distribution generating an updated single object $o_{1\text{-}updated}$, and the updated single object $o_{1\text{-}updated}$ is saved in the objects buffer O;

if the updated distribution satisfies the object distance condition in respect to multiple objects $o_m$ of the initial plurality of objects $o_{n\text{-}initial}$, the multiple objects $o_m$ are merged, generating a merged object $o_{m\text{-}merged}$, and updated including the updated distribution generating an updated merged object $o_{m\text{-}merged\text{-}updated}$, which is saved in the objects buffer O;

In step 8.4. the lightweight representation of the static environment is created and permanently updated by exporting from the objects buffer O:

either the at least one new object $o_{new}$, or the updated object $o_{updated}$, or the merged object $o_{m\text{-}merged}$ into a user interface for immediate use.

The steps 8.2. to 8.4. are repeated for the number n of new sensor data points $Pr_{n\text{-}new}$.

FIG. 4 represents the results of applying the method for processing sensor data points of the prior art for a particular example of the scenario of FIG. 3, representing 22093 raw data points each having 3 coordinates (x, y, dir "reflection direction"), where only x and y coordinates are represented graphically for simplicity.

The distributions presented in the FIG. 5 illustrate the result of the computer-implemented method for processing sensor data points according to the invention. Thus, a total of 320 distributions are used to represent 22093 raw data points.

Each of the 320 distributions require 5 floating points to be saved. That means a total of 5*320=1600 float numbers are required to build the lightweight representation of a static environment comprising the plurality of objects $o_n$.

According to the prior art, a total of (2 for each coordinate)*22093=44186 float numbers are required to represent the raw points of the static environment comprising a plurality of objects $o_n$.

Consequently, the compressed map, specifically the lightweight representation of the static environment comprising a plurality of objects $o_n$, has only approximately 3.6%=1600*100/44186 of the size compared to the uncompressed data. In this example almost 96.4% of the size, of the memory and computing power resources of the data processing hardware is saved by using the predetermined data structure during the processing of the raw data points cloud for successive processing cycles using the method according to the present disclosure.

In other words, compression ratio=uncompressed/compressed is almost 28. i.e., the compressed data is almost 28 times smaller than the uncompressed one.

It is to be noted that the compression ratio depends $o_n$ the density of the sensor data points and the distributions of the clutter and measurements-error. If the later distributions are gaussians then computer-implemented method for processing sensor data points according to the present disclosure to represent the sensor data points will result in a better compression rate.

Different representations of the maps can be created from the objects that were created as a list of distributions. The meaning of the objects created as list of distributions is the grouping of the distributions into objects.

Each specific representation of the map depends on the specific need and on the specific program for creating the specific representation of the map. For example, some specific representations of the maps include polygon-like shapes, whereas other specific representations of the maps include simpler shapes such as convex hulls.

Building the specific representations such as but not limited to polygon-like shapes and convex hulls from the list of distributions are carried out according to algorithms available in the literature.

One possibility is when the new object $o_{new}$, the updated object $o_{updated}$, and the updated merged object $o_{m\text{-}merged\text{-}updated}$ are created out by the means $\mu_n$ of corresponding Gaussian distribution.

Other possibility is when the new object $o_{new}$ the updated object $o_{updated}$, and the updated merged object $o_{m\text{-}merged\text{-}updated}$ are created from two points selected $o_n$ the major axis of the corresponding Gaussian distribution which correspond to a certain probability, e.g., the 2 sigma points, or any other multiple of sigma of the main axis.

When creating the new object $o_{new}$ the updated object $o_{updated}$, and the updated merged object $o_{m\text{-}merged\text{-}updated}$ from two sigma points, in one variant, the corresponding Gaussian distribution has 2*k dimension.

Other possibility is when the new object $o_{new}$ the updated object $o_{updated}$, and the updated merged object $o_{m\text{-}merged\text{-}updated}$ are created from a specific number L of sensor data points Pr of the corresponding Gaussian distribution, said specific number L being sampled from a hyper ellipse corresponding to a certain probability.

The number of new points $Pr_{new}$ are adjusted taking into consideration to not over-fit the distributions in the final map.

The particular advantage of increasing the number of new points $Pr_{new}$ is the more accurate specific map representation while saving memory and computing power resources, enabling use of the invention to process raw sensors data by a wider range of data processing hardware.

Figure 6:
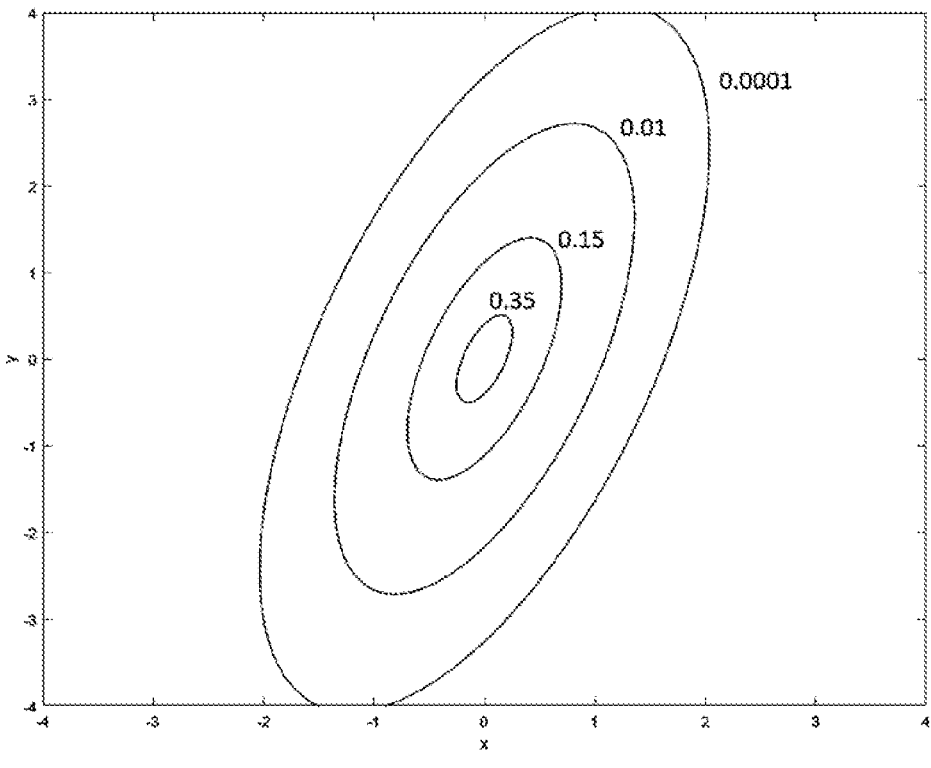
FIG. 6 represents a schematic figure in another embodiment of the present disclosure for the construction of objects based on the ellipses.

FIG. 6 depicts a suggestive image of the above-captioned embodiment detailing the construction of the plurality of objects $o_n$ based $o_n$ the ellipses. Using the constructed ellipses to construct or update the plurality of objects $o_n$, e.g., convex hulls or polygons, can be done similar to using the points where the mean of the Gaussian distributions represents the point location.

However, if the ellipse is large, corresponding to a large variance, then more sensor data points are used to construct the object such as two points from the major axis of the ellipse or more sensor data points from the contour of the ellipse. This ellipse is defined based on a particular Gaussian distribution $g_n$ and a particular probability prob($Pr$, $g_n$), where the probability determine which ellipse from the Gaussian distribution is selected.

Choosing the particular probability is important because a very small probability leads to an ellipse which covers the whole x, y plane, in case of 2D, whereas choosing a large probability means leads to the mean only. Selecting the particular probability prob($Pr$, $g_n$) can be also done based $o_n$ the cumulative distribution function CDF, where it can be chosen the percentage of the points which that should be included in the object.

In a second aspect of the present disclosure, it is provided a data processing hardware being configured to carry out the steps of the method according to any of the embodiments.

In an embodiment, the data processing hardware is further configured to be included in a sensor, having the advantage of using the processor of the sensor for carrying out the method of the present disclosure.

The lightweight representation of the static environment in any of its variants described above can be sent to a drive system of a vehicle in communication with the data processing hardware.

While the description of the method was disclosed in detail in connection to example embodiments, those skilled in the art will appreciate that various modifications and alterations of the present disclosure will be apparent without departing from the essential scope to the teaching of the present disclosure and without diminishing its advantages. It is therefore intended that such modifications and alterations be covered by the appended claims.

LIST OF SYMBOLS $Pr_{new}$—a new sensor data point received from the at least one sensor $Pr_{n\text{-}new}$—a number n of new sensor data points Pr—an initial plurality of sensor data points $g_n$—an initial plurality of Gaussian distributions $g_{n\text{-}updated}$—the updated plurality of Gaussian distributions G—a distributions buffer comprising a plurality of Gaussian distributions g—each Gaussian distribution of the plurality of Gaussian distributions G Dd—the distribution distance between the new sensor data point $Pr_{new}$ and each Gaussian distribution g $Dd_{min}$—a predetermined distribution distance threshold $g_{new}$—a new Gaussian distribution including the new sensor data point $Pr_{new}$ $g_1$—the single Gaussian distribution fulfilling the distribution distance condition $Dd < Dd_{min}$ $g_{1\text{-}updated}$—the updated single Gaussian distribution including the new sensor data point $Pr_{new}$ $g_1, g_2, g_m$—the at least two Gaussian distributions fulfilling the distribution distance condition $Dd < Dd_{min}$ $g_{m\text{-}merged}$—the merged Gaussian distribution of the at least two Gaussian distributions $g_1, g_2, \ldots, g_m$ $g_{m\text{-}merged\text{-}updated}$—the updated merged Gaussian distribution of the merged Gaussian distribution $g_{m\text{-}merged}$ including the new sensor data point $Pr_{new}$ O—a buffer comprising a plurality of objects $o_{n\text{-}initial}$—an initial plurality of objects created as a list of distributions from the initial plurality Gaussian distributions $g_n$ $o_{n\text{-}updated}$—the updated plurality of objects created based on updated plurality of Gaussian distributions $g_{n\text{-}updated}$ $o_n$—the plurality of objects created by using the initial plurality Gaussian distributions $g_n$, and updated plurality of Gaussian distributions $g_{n\text{-}updated}$ Do—the object distance computed from the updated distribution to each object o of the initial plurality of objects $o_{n\text{-}initial}$ $Do_{min}$—the predetermined object distance threshold $o_{new}$—the new object generated by assigning the new Gaussian distribution $g_{new}$ $o_1$—the single object fulfilling object distance condition $Do < Do_{min}$ $o_{1\text{-}updated}$—the updated single object $o_1$ including the updated distribution $o_m$—the multiple objects fulfilling object distance condition $Do < Do_{min}$ $o_{m\text{-}merged}$—the merged object including the multiple objects $o_m$ fulfilling object distance condition $Do < Do_{min}$ $o_{m\text{-}merged\text{-}updated}$—the updated merged object of the merged object including the updated distribution.

The invention claimed is:

1. A computer-implemented method for processing sensor data points, comprising by data processing hardware:

1.1. initializing, by data processing hardware, a distributions buffer G for storing an initial plurality of Gaussian distributions $g_n$, each Gaussian distribution g comprising an initial plurality of sensor data points Pr received sequentially from at least one sensor, each Gaussian distribution g having an associated predetermined distribution distance threshold $Dd_{min}$;

1.2. sequentially acquiring, by the data processing hardware, a new sensor data point $Pr_{new}$ from the at least one sensor and computing a distribution distance Dd between the new sensor data point $Pr_{new}$ and each Gaussian distribution g;

1.3. verifying, by the data processing hardware, for each Gaussian distribution g if the distribution distance Dd fulfills a distribution distance condition $Dd < Dd_{min}$, respectively distribution distance $Dd <$ the associated predetermined distribution distance threshold $Dd_{min}$;

1.3.1. if no Gaussian distribution g fulfills the distribution distance condition $Dd < Dd_{min}$, generating, by the data processing hardware, a new Gaussian distribution $g_{new}$, including the new sensor data point $Pr_{new}$, 1.3.2. if the distribution distance condition $Dd < Dd_{min}$ is fulfilled by a single Gaussian distribution $g_1$, updating, by the data processing hardware, the single Gaussian distribution $g_1$ by adding the new sensor data point $Pr_{new}$, generating an updated single Gaussian distribution $g_{1\text{-}updated}$, 1.3.3. if the distribution distance condition $Dd < Dd_{min}$ is fulfilled by at least two Gaussian distributions $g_1$, $g_2, \ldots g_m$, merging, by the data processing hardware, the at least two Gaussian distributions $g_1, g_2 \ldots g_m$, generating a merged Gaussian distribution $g_{m\text{-}merged}$, and updating, by the data processing hardware, the merged Gaussian distribution $g_{m\text{-}merged}$ by adding the new sensor data point $Pr_{new}$, generating an updated merged Gaussian distribution gm-merged-updated, 1.4. updating, by the data processing hardware, the initial plurality of Gaussian distributions gn by including the new Gaussian distribution $g_{new}$, or the updated single Gaussian distribution $g_{1\text{-}updated}$, or the updated merged Gaussian distribution $g_{m\text{-}merged\text{-}updated}$, and generating, by the data processing hardware, an updated plurality of Gaussian distributions $g_{n\text{-}updated}$ in the distributions buffer G, wherein the acts 1.2., 1.3., and 1.4. are repeated for a number n of new sensor data points $Pr_{n\text{-}new}$.

2. Computer-implemented method according to claim 1, wherein the distribution distance Dd is a Euclidian distance between the new sensor data point $Pr_{new}$ and a mean $\mu_g$ of each Gaussian distribution g.

3. Computer-implemented method according to claim 1, wherein the distribution distance Dd is a probability of the new sensor data point $Pr_{new}$ in respect to each Gaussian distribution g as follows:

$$D_d = prob(Pr_{new}, g_n) = \mathcal{N}\left(Pr_{new}; \mu_n, \sum\nolimits_n\right) =$$

$$(2\pi)^{-\frac{k}{2}} \det \left(\sum\nolimits_n\right)^{-\frac{1}{2}} \exp\left(-\frac{1}{2}(Pr_{new} - \mu_n)^T \sum\nolimits_n^{-1} (Pr_{new} - \mu_n)\right)$$

where:

$\mathcal{N}$ ($P_{rnew}$; $\mu_n$, $\Sigma_n$) is the probability that the new point $P_{rnew}$ is generated from each Gaussian distribution g;

$Pr_{new}$ is a new sensor data point, being a vector of k entries;

$\mu_n$ is the mean of each Gaussian distribution g, being a vector of k entries;

$\Sigma_n$ is the covariance of each Gaussian distribution g, being a (k×k) matrix;

T is the transpose.

4. Computer-implemented method according to claim 1, wherein the distribution distance Dd is computed using a Mahalanobis distance formula.

5. Computer-implemented method according to claim 1, wherein a sequential update of the updated single Gaussian distribution $g_{1\text{-}updated}$, and the updated merged Gaussian distribution $g_{m\text{-}merged\text{-}updated}$ by sequentially adding a number n of new sensor data points $Pr_{n\text{-}new}$ are carried out by the formulas:

$$\mu_{g_{n\text{-}updated}} = \frac{n-1}{n}\mu_{g_n} + \frac{1}{n}Pr_{n\text{-}new}$$

and $$\sum_{g_{n_{updated}}} = \frac{n-2}{n-1}\sum_{g_n} + \frac{1}{n}\Delta\Delta^T,$$

and $$\Delta = Pr_{n\text{-}new} - \mu_{g_n}$$

where:

$\mu_{g_n}$ is a mean of any of the single Gaussian distribution $g_1$, and the merged Gaussian distribution $g_{m\text{-}merged}$;

$\Sigma_{g_n}$ is a covariance of any of the single Gaussian distribution $g_1$ and a merged Gaussian distribution $g_{m\text{-}merged}$;

$\mu_{g_{n\text{-}updated}}$ is a mean of any of the updated single Gaussian distribution $g_{1\text{-}updated}$, and the updated merged Gaussian distribution $g_{m\text{-}merged\text{-}updated}$;

$\Sigma_{g_{n\text{-}updated}}$ is a covariance of any of the updated single Gaussian distribution $g_{1\text{-}updated}$, and the updated merged Gaussian distribution $g_{m\text{-}merged\text{-}updated}$; and T is the transpose.

6. Computer-implemented method according to claim 1, wherein the new sensor data point $Pr_{new}$ is provided with a covariance matrix $\Sigma_{Pr_{new}}$, forming a sensor data points Gaussian distribution $N_{Pr_{new}}(\mu_{Pr_{new}}, \Sigma_{Pr_{new}})$ and the distribution distance Dd is computed between each Gaussian distribution g and the sensor data points Gaussian distribution $N_{Pr_{new}}$ using a Kullback-Leibler divergence or a Bhattacharyya distance.

7. Computer-implemented method according to claim 1, wherein the merging of the at least two Gaussian distributions $g_1, g_2 \ldots g_m$ is carried out by successive merging pairs of two distributions from at least two Gaussian distributions $g_1, g_2 \ldots g_m$ generating a merged Gaussian distribution $g_{m\text{-}merged}$, by weighting mean and variance of the two distributions from respective pairs of two distributions.

8. Computer-implemented method according to claim 1, wherein a lightweight representation of a static environment comprising a plurality of objects $o_n$ from a buffer O is created by using the initial plurality Gaussian distributions $g_n$, and updated plurality of Gaussian distributions $g_{n\text{-}updated}$ from the distributions buffer G in the following carried out by the data processing hardware:

8.1. Defining an initial plurality of objects $o_{n\text{-}initial}$ as a list of distribution from the initial plurality Gaussian distributions $g_n$, 8.2. Receiving from the distributions buffer G an updated distribution from the updated plurality of Gaussian distributions $g_{n\text{-}updated}$, comprising: the new Gaussian distribution $g_{new}$, the updated single Gaussian distribution $g_{1\text{-}updated}$, or the updated merged Gaussian distribution $g_{m\text{-}merged\text{-}updated}$, and computing an object distance Do from the updated distribution to each object o of the initial plurality of objects $o_{n\text{-}initial}$;

8.3. Verifying if the updated distribution satisfies an object distance condition $Do<Do_{min}$, namely if the object distance Do<a predetermined object distance threshold $Do_{min}$n and updating the initial plurality of objects $o_{n\text{-}initial}$, generating an updated plurality of objects $o_{n\text{-}updated}$ depending on the type of updated distribution as follows:

8.3.1. When the updated distribution is the new Gaussian distribution $g_{new}$, the updating of the initial plurality of objects $o_{n\text{-}initial}$ is carried out as follows:

if the updated distribution does not satisfy the object distance condition $Do<Do_{min}$ in respect to any object from the initial plurality of objects $o_{n\text{-}initial}$, generating a new object $o_{new}$ by assigning the new Gaussian distribution $g_{new}$ and saving the new object $o_{new}$ in the objects buffer O;

if the updated distribution satisfies the object distance condition $Do<Do_{min}$ in respect to a single object $o_1$, updating of the single object $o_1$ by assigning the new Gaussian distribution $g_{new}$, generating an updated single object $o_{1\text{-}updated}$, and saving the updated single object $o_{1\text{-}updated}$ in the objects buffer O;

if the updated distribution satisfies the object distance condition $Do<Do_{min}$ in respect to multiple objects $o_m$ of the initial plurality of objects $o_{n\text{-}initial}$, merging the multiple objects $o_m$ generating a merged object $o_{m\text{-}merged}$, updating the merged object $o_{m\text{-}merged}$ by assigning new Gaussian distribution $g_{new}$ generating an updated merged object $o_{m\text{-}merged\text{-}updated}$ and saving the updated merged object $o_{m\text{-}merged\text{-}updated}$ in the objects buffer O;

8.3.2. When the updated distribution is the updated single Gaussian distribution $g_{1\text{-}updated}$, the updating of the initial plurality of objects $o_{n\text{-}initial}$ is carried out by updating the corresponding the object o comprising the single Gaussian distribution $g_1$, generating an updated object $o_{updated}$, and saving the updated object $o_{updated}$ in the objects buffer O;

8.3.3. When the updated distribution is the updated merged Gaussian distribution $g_{m\text{-}merged\text{-}updated}$, the updating of the initial plurality of objects $o_{n\text{-}initial}$ is carried out as follows:

if the updated distribution satisfies the object distance condition $Do<Do_{min}$ in respect to a single object $o_1$, updating of the single object $o_1$, generating an updated single object $o_{1\text{-}updated}$ by including the updated distribution, and saving the updated single object $o_{1\text{-}updated}$ in the objects buffer O;

if the updated distribution satisfies the object distance condition in respect to multiple objects $o_m$ of the initial plurality of objects $o_{n\text{-}initial}$, merging the multiple objects Om generating a merged object $o_{m\text{-}merged}$, updating the representation of the merged object $o_{m\text{-}merged}$ by including the updated distribution generating an updated merged object $o_{m\text{-}merged\text{-}updated}$ and saving the updated merged object $o_{m\text{-}merged\text{-}updated}$ in the objects buffer O;

8.4. Creating and permanently updating the lightweight representation of the static environment by exporting from the objects buffer O: the new object $o_{new}$, or the updated single object $o_{1\text{-}updated}$, or the updated merged object $o_{m\text{-}merged}$ into a user interface for immediate use, wherein acts 8.2. to 8.4. are repeated for the number n of new sensor data points $Pr_{n\text{-}new}$.

9. Computer-implemented method according to claim 8, wherein the new object $o_{new}$, the updated object $o_{updated}$, and the updated merged object $o_{m\text{-}merged\text{-}updated}$ are created out by the means $\mu_n$ of corresponding Gaussian distribution.

10. Computer-implemented method according to claim 8, wherein the new object $o_{new}$, the updated object $o_{updated}$, and the updated merged object $o_{m\text{-}merged\text{-}updated}$ are created from two points selected on a major axis of the corresponding Gaussian distribution which correspond to a certain probability.

11. Computer-implemented method according to claim 10, wherein the corresponding Gaussian distribution has 2*k points of each Gaussian distribution g, where k is a dimension of a corresponding Gaussian distribution.

12. Computer-implemented method according to claim 8, wherein the new object $o_{new}$, the updated object $o_{updated}$, and the updated merged object $o_{m\text{-}merged\text{-}updated}$ are created from a specific number L of sensor data points $Pr_L$ of the corresponding Gaussian distribution, the specific number L being sampled from a hyper ellipse corresponding to a certain probability.

13. Computer-implemented method according to claim 8, wherein the lightweight representation of the static environment is sent to a drive system of a vehicle in communication with the data processing hardware.

14. A data processing hardware being configured to carry out the method according to claim 1.

15. The data processing hardware of claim 14 being further configured to be included in a sensor.

16. The data processing hardware of claim 15, wherein the sensor comprises an ultrasonic sensor.

* * * * *